April 9, 1929.  G. KLUMPP  1,708,422
ELECTRIC COOKING STOVE
Filed April 4, 1927   2 Sheets-Sheet 1
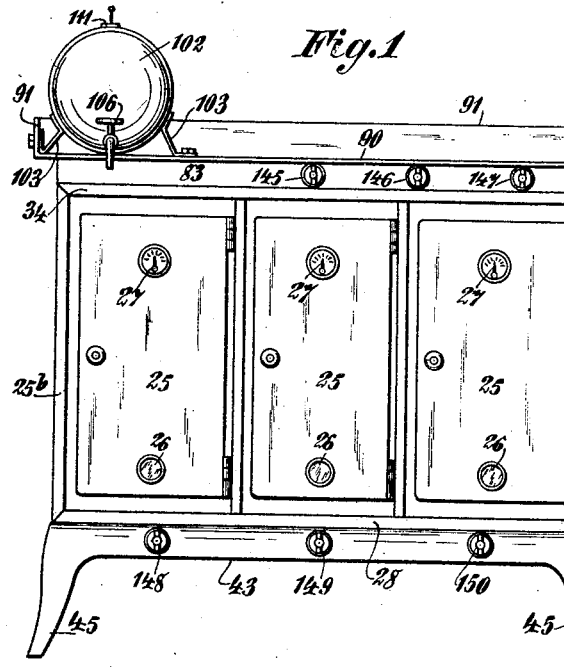
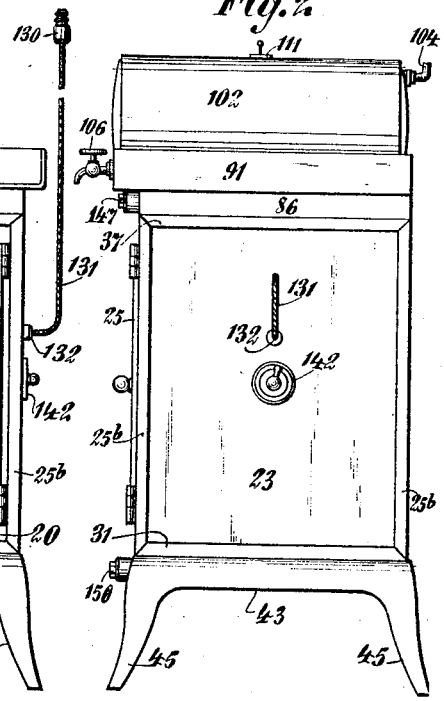
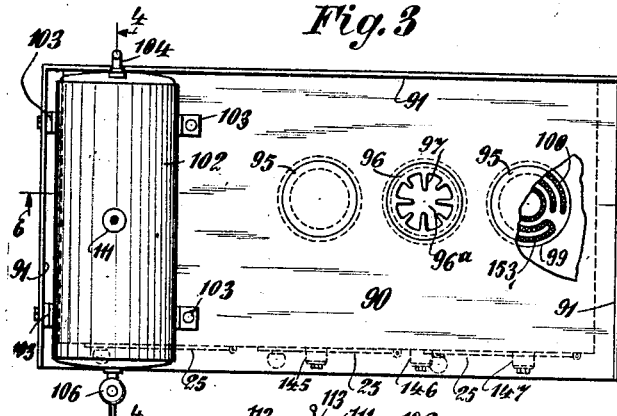
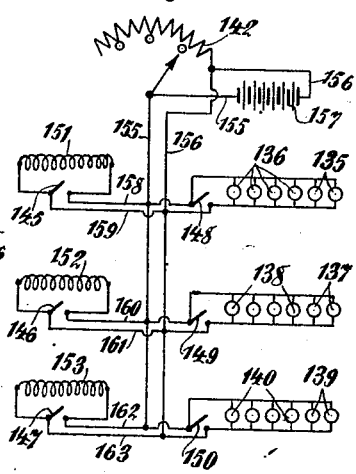
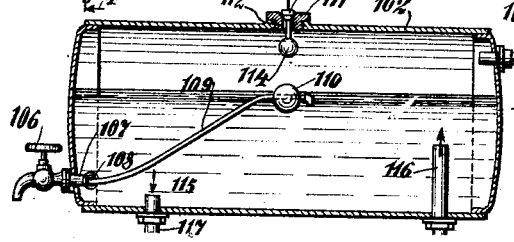
Inventor:
Gottlob Klumpp,
By his attorney
A. A. de Bonneville April 9, 1929.　　　G. KLUMPP　　　1,708,422
ELECTRIC COOKING STOVE
Filed April 4, 1927　　　2 Sheets-Sheet 2
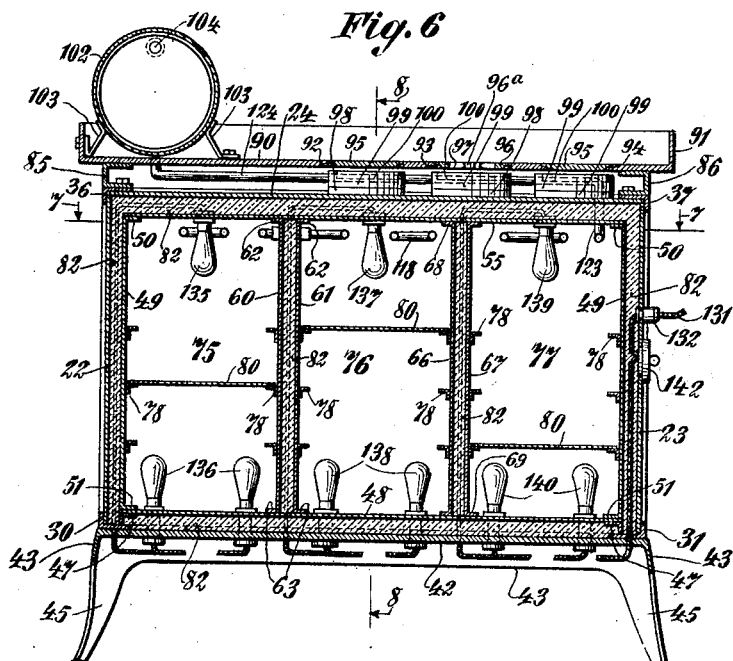
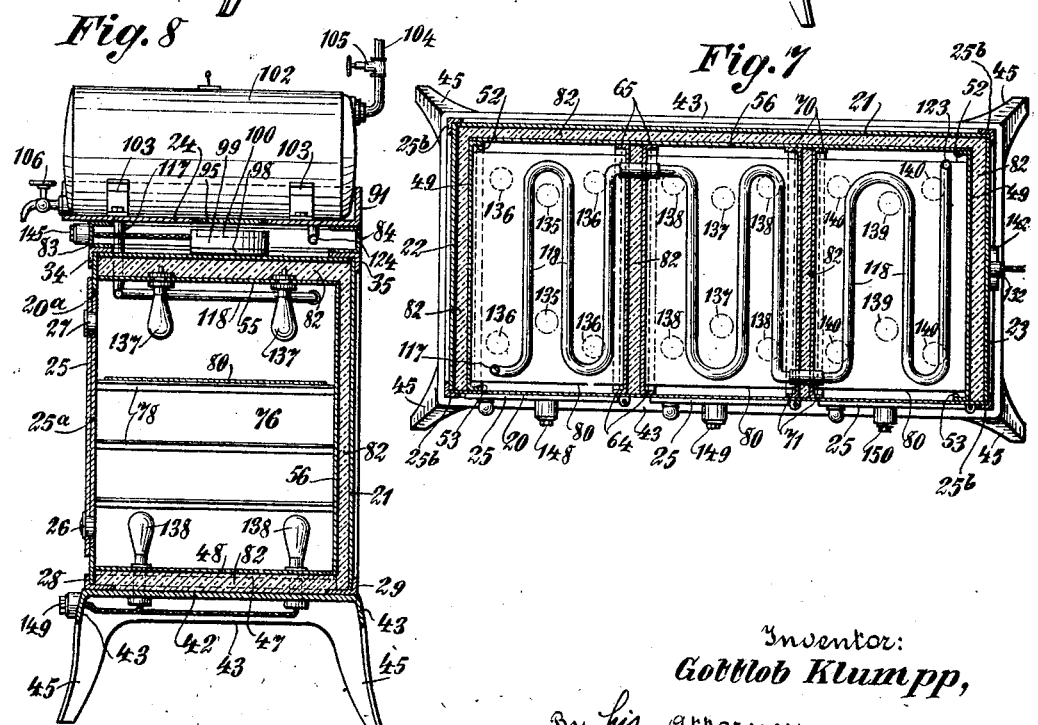
Inventor:
Gottlob Klumpp,
By his attorney Patented Apr. 9, 1929.

1,708,422

UNITED STATES PATENT OFFICE.

GOTTLOB KLUMPP, OF NEW YORK, N. Y.

ELECTRIC COOKING STOVE.

Application filed April 4, 1927. Serial No. 180,781.

This invention relates to an electric cooking stove.

The object of the invention is the production of an electric cooking stove, in which an object can be heated or cooked, by means of the heat furnished by electric light bulbs, or the heat generated in an electric resistance coil. The second object of the invention is the production of an electric cooking stove which has connected thereto a boiler, in which the water therein is also heated by the heat generated by electric light bulbs, and from which the water can be drawn at its upper surface to obtain the discharge of the hottest water in the boiler, before the water of lower temperature is drawn therefrom.

In the accompanying drawings Fig. 1 represents a front elevation of an exemplification of the electric cooking stove; Fig. 2 shows a right and side view of Fig. 1; Fig. 3 is a top plan view of Fig. 1, Fig. 4 indicates an enlarged partial section of the stove on the line 4, 4 of Fig. 3; Fig. 5 represents a wiring diagram of the electric appurtenances of the electric stove; Fig. 6 represents a section of Fig. 3 on the line 6, 6; Fig. 7 shows a section of Fig. 6 on the line 7, 7 and Fig. 8 indicates a section of Fig. 6 on the line 8, 8.

The body of the stove is indicated as having the outer front plate or wall 20, the outer rear plate or wall 21, the outer side plates or walls 22, 23 and the outer top plate or wall 24. Doors 25, having each a sight tube with its glass 26 and a thermometer having an indicator 27 are hinged to the front plate 20, over openings 20ª therein. The doors 25 are shown with the back plate 25ª. Angle irons 25ᵇ connect the corners of the outer walls of the stove.

A bottom connecting member comprises the front portion 28, the rear portion 29 and the side portions 30 and 31. Said portions are angular in cross section as indicated in the drawings and are connected to and support the lower portions of the said walls of the stove. A top connecting member similar to the bottom connecting member, comprises the front portion 34, the rear portion 35 and the side portions 36 and 37. The said top connecting member is fastened to and connects the upper ends of the outer walls of the stove and the top plate 24.

The base of the stove is indicated at 42, that has formed therewith the depending flange 43 and the legs 45. The bottom connecting member having the portions 28, 29, 30 and 31 is supported on the said base 42.

A pair of angle irons 47 bear on and are connected to the side portions 30 and 31 of the bottom connecting member. An inner bottom plate or wall 48 is supported upon and fastened to the angle irons 47. Inner side walls 49 are indicated with the horizontal flanges 50, 51 and the vertical flanges 52 and 53. The flanges 51 bear upon and are fastened to the bottom plate or wall 48. An inner top plate or wall 55 is supported upon and fastened to the flanges 50. The flanges 53 are fastened to the outer front plate or wall 20. An inner rear plate or wall is shown at 56 connected to the flanges 52. A pair of vertical partition walls or plates 60, 61 are each indicated with the top horizontal flanges 62, the bottom horizontal flanges 63, the front vertical flanges 64 and the rear vertical flanges 65. A pair of similar vertical partition plates 66, 67 have formed therewith the flanges 68, 69, 70 and 71. The flanges 62 and 68 are fastened to the inner top plate or wall 55, and the flanges 63 and 69 are fastened to the bottom plate 48. The flanges 65 and 70 are fastened to the plate 56 and the flanges 64 and 71 are fastened to the plate 20. The said pairs of partition plates 60, 61 and 66, 67 form the inner chambers 75, 76 and 77 with the front outer wall 20 and the inner walls of the stove. Angle irons 78 are fastened to the inner side walls 49 and to the pairs of partition walls 60, 61 and 66, 67 for the shelves 80. Mineral wool 82 is packed between the outer wall of the stove and the walls of the chambers 75, 76 and 77, and between the partition plates 60, 61 and 66, 67.

A channel shaped bracket is indicated as having the front leg 83, rear leg 84 and the side legs 85 and 86. The said bracket is supported upon and fastened to the top plate or wall 24 of the stove.

An operating table 90 having the flanges 91 is supported upon and fastened to the said channel shaped bracket. The table 90 has formed therein three circular openings 92, 93 and 94. Detachable covers 95 are provided for the openings 92 and 94, and a detachable cover 96 having an opening 96ª with the prongs 97 is provided for the opening 93. Upon the top plate 24 are located in this instance, similar discs 98 of asbestos, upon which are located the discs 99 of refractory material. In the upper faces of each of the discs 99 are formed the circular grooves 100, which latter are preferably semicircular in cross-section. Each pair of discs 98 and 99 are in line with one of the circular openings in the top plate 24 and are fastened to said plate 24, by bolts not shown.

A hot water boiler 102 has extending therefrom the brackets 103, which are fastened to the table 90 and to one of its flanges 91. An inlet pipe for water is indicated at 104. An inlet valve 105 is connected to the pipe 104. An outlet faucet 106 is connected to one of the heads of the boiler. Piping 107 is connected to said faucet, and a swing joint 108 is connected to said piping 107. An outlet pipe 109 extends from the swing joint 108 and carries the ball float 110. A screw plug 111 has formed therein an opening 112 having a valve seat at its upper end for the safety valve 113, having the counterweight 114. An outlet nipple 115 and an inlet nipple 116 are connected to the boiler 102. The nipple 115 connects with the vertical pipe 117, which joins with the horizontal zigzag coil 118 and then joins with the vertical pipe 123. The latter joins with the return pipe 124 that leads to the inlet nipple 116. The zigzag coil 118 is disposed to extend through the upper portions of the chambers 75, 76 and 77.

An electric light socket 130, which can be connected to a source of electric current is indicated with the cable 131, that leads to the fitting 132 connected to the wall 23 of the stove. From the inner top plate or wall 55 of the stove extend into the chamber 75, the pair of electric light bulbs 135 and to the plate or wall 48, are connected the four electric light bulbs 136, that extend into said chamber. From the plate 55, extend into the chamber 76, the pair of electric light bulbs 137, and to the plate 48 are connected the four electric light bulbs 138, that extend into said chamber 76. To the plate 55 are connected the pair of electric light bulbs 139, and to the plate or wall 48 are connected the four electric light bulbs 140, all of which extend into the chamber 77. To the wall 23 is secured a rheostat 142. Electric light switches 145, 146 and 147 are connected to the leg 83 of the channel shaped bracket, and electric light switches 148, 149 and 150 are connected to the front portion of the flange 43 of the base of the stove. In the grooves 100 of each of the discs 99 are respectfully located the similar resistance coils 151, 152 and 153.

Referring to Fig. 5 the wires 155, 156 are indicated to represent the wires of the cable 131, and are shown to extend from the electric battery 157 or other source of electric current. The wires 155 and 156 lead to the rheostat 142. The wire 158 is connected to the wire 155 and one end thereof extends to the resistance coil 151, and its other end extends to the electric light bulbs 135, 136.

The switch 148 is connected to the wire 158. The wire 159 is connected to the wire 156 and at one end leads to the switch 145 and the coil 151, while its other end leads to the electric light bulbs 136 and 135. A wire 160 is connected to the wire 155 and at one end leads to the coil 152, and at its other end leads to the switch 149 and the electric light bulbs 138, 137. A wire 161 is connected to the wire 156 and at one end leads to the switch 146 and the resistance coil 152, and at its other end leads to the electric light bulbs 138, 137. A wire 162 is connected to the wire 155 and at one end leads to the resistance coil 153 while at its other end it leads to the switch 150 and the electric light bulbs 140, 139. A wire 163 is connected to the wire 156 and at one end leads to the switch 147 and the resistance coil 153 while at its other end it leads to the electric light bulbs 140, 139.

The plate 25ᵃ of the door 25 may be separated therefrom and the space filled with heat insulating material not shown.

To use the cooking stove the material to be heated or cooked is located in requisite utensils, which are placed within the stove using the shelves 80, and the doors 25 are closed. The boiler 120 is charged with water through the inlet pipe 104 and either one or a plurality of the electric light switches are turned, to energize such of the electric light bulbs and the electric resistance coils as may be required, and the material is operated upon until cooked.

If it is required to draw water from the boiler 102, the faucet 106 is opened and the water will be discharged from said faucet. The water is led to said faucet through the outlet pipe 109 and enters the latter from the upper surface of the water. By this means the hot water which is at the top level in the boiler is first withdrawn therefrom.

Having described my invention what I desire to secure by Letters Patent and claim is:

In an electric cooking stove the combination of walls therefor, one of said walls constituting a top plate, electric light bulbs extending into the stove in close proximity to said top plate, an operating table above said top plate, a coil for the circulation of water in the stove adjacent to said electric light bulbs, piping in said table connected to said coil, the piping adapted to be connected to a boiler, and means to energize said electric light bulbs, heating the water circulating through said coil.

In testimony whereof I affix my signature.

GOTTLOB KLUMPP.